March 9, 1965   D. F. WRIGHT   3,173,067
TEMPERATURE-COMPENSATED PERMANENT-MAGNET DEVICES
Filed March 22, 1962

INVENTOR
David F. Wright
BY *J. J. Reisman*
ATTORNEY

United States Patent Office 3,173,067
Patented Mar. 9, 1965

3,173,067
TEMPERATURE-COMPENSATED PERMANENT-MAGNET DEVICES
David F. Wright, House Creek Township, Wake County, N.C., assignor to Westinghouse Electric Corporation, East Pittsburgh, Pa., a corporation of Pennsylvania
Filed Mar. 22, 1962, Ser. No. 181,596
7 Claims. (Cl. 317—167)

This invention relates to magnetic assemblies, and it has particular relation to magnetic damping assemblies for induction disc-type instruments.

Various instruments, such as integrating watthour meters, power relays and the like, operate on the induction motor principle, whereby a suitable armature member, which may be in the form of an electroconductive disc, is mounted for rotation under the influence of displaced alternating magnetic fields to produce a response representative of conditions in an electrical circuit. This disc armature commonly is carried by a shaft which is mounted for rotation in suitable bearings, and which, consequently, would tend to rotate at a relatively high rate of speed if damping means were not provided.

Induction disc-type instruments may be provided with one or more permanent magnet damping assemblies, each of which has an air gap for receiving a portion of the disc. Such an assembly provides a magnetic field for the electroconductive disc and acts to damp or retard rotation of the disc by a retarding force or torque which is proportional to the rate of rotation of the disc and to the square of the air gap flux density. As the disc rotates, eddy currents are produced in the portion thereof which cuts the magnetic flux lines traversing the air gap of the magnetic assembly. These eddy currents produce magnetic flux lines which, in turn, react with the flux lines of the magnetic assembly to effect the desired damping of the disc.

As is known in the art, the remanence or flux of a permanent magnet of the type generally employed in a damping assembly for an induction disc-type instrument varies in response to ambient temperature change. In order that the rotational speed of the disc may be substantially unaffected by such variation, it is necessary to provide compensation therefor.

In accordance with the invention, the return path for flux produced by a permanent magnet in the air gap of a damping assembly for an induction disc-type instrument includes adjacent members of soft magnetic materials having substantially different temperature coefficients of permeability. By suitably locating and proportioning these members, the distribution pattern of flux in the air gap varies in response to ambient temperature change sufficiently to compensate for variation in remanence or flux of the permanent magnet with such temperature change. As a result, the rotational speed of the disc is substantially unaffected by the aforesaid flux variation.

The invention is particularly suitable in a damping assembly which does not lend itself to compensation by means of a conventional ambient temperature responsive flux shunt, for example, an assembly which includes a permanent magnet of the ceramic or ferrite type. A ceramic or ferrite permanent magnet may be formed of material having the chemical composition $MO.6Fe_2O_3$, wherein M may represent barium, strontium or lead. Barium ferrite having the composition $BaO.6Fe_2O_3$ is available commercially and is satisfactory. Such a magnet may have a coercive force in excess of 1500 oersteds and has excellent resistance to corrosion, extremely high stability and resistance to both self and external demagnetization and is relatively lightweight and inexpensive.

A ferrite magnet has a relatively high negative temperature coefficient of remanence or magnetic flux. In addition, such a magnet has a permeability approximately the same as that of air, or one and thus has little leakage flux at right angles to the direction of its magnetization. Consequently, a magnetic assembly comprising such a magnet does not lend itself to compensation with a conventional flux shunt for the relatively large variation in remanence or flux of the magnet and the resulting large change in air gap flux density in response to ambient temperature variation.

It is, therefore, an object of the invention to provide an improved damping assembly for induction disc-type instruments.

It is another object of the invention to provide a damping assembly for induction disc-type instruments including a permanent magnet and means for compensating for variation in a magnetic property of such a magnet in response to ambient temperature change.

It is a further object of the invention to provide a damping assembly as set forth in the preceding object, in which ambient temperature compensation is effected by members formed of soft magnetic materials having substantially different temperature coefficients of permeability.

Other objects of the invention will be apparent from the following description taken in conjunction with the accompanying drawing, in which.

Figure 1:
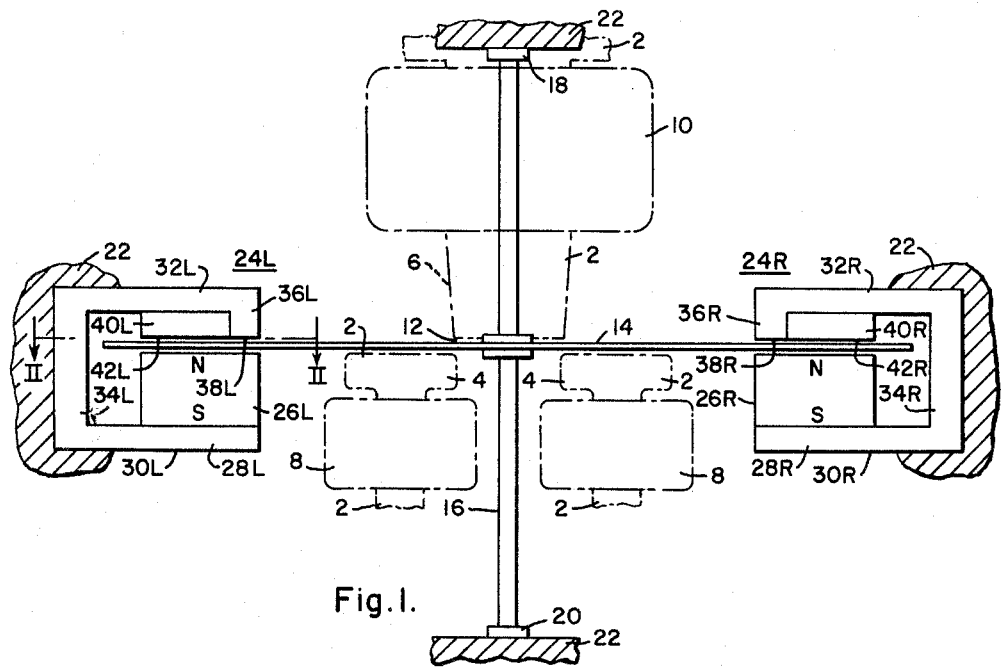
FIGURE 1 is a view in front elevation with parts broken away and parts not shown of an electrical measuring instrument embodying the invention.
Figure 2:
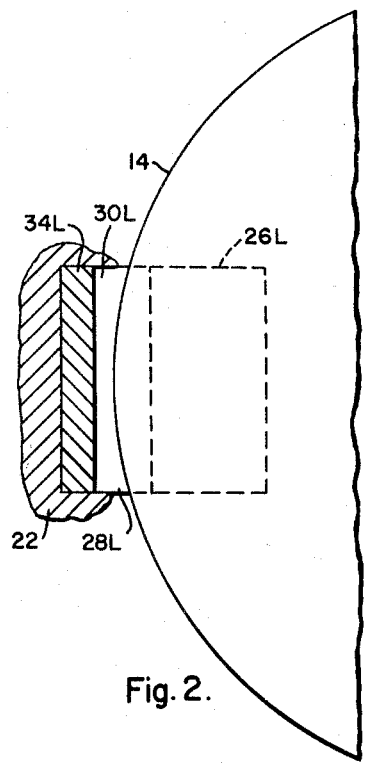
FIG. 2 is a view taken along the line II—II of FIG. 1.

Referring to the drawing, FIGS. 1 and 2 show an electrical measuring instrument of the induction disc-type. For illustrative purposes, it will be assumed that this instrument is an integrating watthour meter of conventional construction responsive to energy flowing in a single phase alternating-current circuit (not shown). The instrument may include a magnetic structure 2 constructed of a plurality of laminations (not shown) of a suitable magnetic material, such as steel, disposed in stacked relation to provide a pair of spaced current poles 4 and a single voltage pole 6. The current poles 4 and the voltage pole 6 are provided with windings 8 and 10, respectively, and are positioned relative to one another to have the pole faces thereof spaced to provide an air gap 12, in which an electroconductive armature or disc 14 is mounted for rotation. It will be understood that when the voltage winding 10 is energized in accordance with the voltage of an alternating-current circuit and the current windings 8 are energized in accordance with current flowing in such alternating-current circuit, a shifting magnetic field is established in the air gap 12 containing the disc 14. This shifting magnetic field results in the application of torque acting between the disc 14 and the electromagnet comprising the magnetic structure 2, the current winding 8 and the voltage winding 10 to produce rotation of the disc. This torque is proportional to the power flowing in the associated alternating-current circuit.

The electroconductive disc or armature 14 is secured for rotation about a vertical axis to a shaft 16. This shaft cooperates with an upper bearing assembly 18 and a lower bearing assembly 20 to mount the disc 14 for rotation with respect to the electromagnet. The upper and lower bearing assemblies 18 and 20 are secured to the electromagnet in any suitable manner, as by means of a frame 22.

Inasmuch as the construction of a watthour meter of the type set forth above is well known in the art, it appears unnecessary to describe it further. Suffice it to say that the disc shaft 16 may be associated with a conventional register (not shown) which is driven by the shaft to register energy consumed in the alternating-current electrical circuit with which the watthour meter is associated.

In order to damp rotation of the disc 14, one or more magnetic damping assemblies may be employed. In the embodiment of FIG. 1, two similar damping assemblies 24L and 24R have air gaps within which the disc 14 is mounted for rotation. Consequently, the damping assemblies retard rotation of the disc 14 with a force or torque which is dependent upon the rate of rotation of the disc.

Inasmuch as the damping assemblies 24L and 24R are substantially identical, reference will be made to the construction of the assembly 24L. It will be observed that component parts of the assembly 24R bear the same reference characters as the corresponding parts of the assembly 24L, with the suffix R substituted for the suffix L.

The assembly 24L, which is secured to the frame 22 by any suitable means, includes a permanent magnet 26L preferably having planar surfaces and constructed of a ceramic or ferrite permanent magnet material. As has been pointed out above, this material may be barium ferrite having a chemical formula $BaO.6Fe_2O_3$, wherein Ba represents barium, Fe represents iron and O represents oxygen.

In order to maximize the damping effect, the magnetic domains of this material are aligned or oriented by a process well known in the art. For exemplary purposes, it is assumed that the domain-oriented permanent magnet 26L is magnetized to provide an upper north pole and a lower south pole, indicated respectively in FIG. 1 by the reference characters N and S. Desirably, the magnet 26L (in this case the pole face of its north pole N) is placed as close as practicable to the disc 14 for further increasing damping efficiency. As a result, however, and due to the fact that the magnet has a permeability approximately the same as that of air (one), there is little leakage flux. Consequently, the assembly does not lend itself to compensation by means of a conventional shunt, such as that of the nickel steel type, for the relatively large variation in flux of the ferrite magnet in response to ambient temperature change.

In order to effect such compensation, the magnet 26L is secured by any suitable means, such as cementing, to a lower leg 28L of a substantially U or C-shaped body portion 30L of the damping assembly 24L. The body portion 30L also has an upper leg 32L. The two legs 28L and 32L are joined by a yoke portion 34L.

The body portion 30L also has an extension 36L, which projects toward the magnet 26L and which has a lower planar surface 38L spaced from the magnet. Secured to the upper body portion leg 32L by any suitable means, such as cementing, is a member 40L adjacent the extension 36L. The member 40L has a lower planar surface 42L adjacent the surface 38L, the overall dimensions of the combined surfaces 38L and 42L being substantially the same as those of the north pole face of the permanent magnet 26L. The surfaces 38L and 42L thus define with the north pole face of the magnet an air gap for receiving a radially-extending portion of the disc 14.

To provide a return path for flux produced by the magnet 26L in the air gap, the body portion 30L of the damping assembly, its extension 36L and the member 40L are formed of soft magnetic materials. These materials have substantially different temperature coefficients of magnetic permeability. In a preferred embodiment of the invention, the body portion and its extension are formed of cold rolled steel having a relatively low temperature coefficient of magnetic permeability, and the member 40L is formed of nickel steel having a relatively high negative temperature coefficient of magnetic permeability.

As ambient temperature increases, for example, the flux of the magnet 26L decreases, tending to increase the rotational speed of the disc 14, but the permeability of the member 40L decreases, while that of the extension 36L changes by a relatively small amount. As a result, the area of the lower surface 42L of the member 40L effectively decreases, and the distribution pattern of magnetic flux in the air gap varies or shifts with respect to the disc 14, i.e., the flux density toward the center of the disc tends to increase while that toward its edge tends to decrease. It will be apparent that the shift is in the opposite direction when ambient temperature decreases. Since the damping torque varies as the square of the flux density and as the first power of the area of the disc intersected by the flux, compensation may be provided for the change in flux of the ferrite permanent magnet 26L with variation in ambient temperature by suitably proportioning the extension 36L and the member 40L.

It is well known that as the damping magnet for an induction disc is moved away from the rotational axis of the disc, the damping force or torque first increases for a given air gap flux density and ambient temperature as the torque arm increases in length, then reaches a maximum and thereafter decreases, although the torque arm continues to increase, due to the crowding of eddy currents toward the edge of the disc. Advantage may be taken of this effect in order to obtain optimum ambient temperature compensation by means of the magnetic assembly 24L. Thus, the assembly preferably is spaced from the axis of the disc by a distance which is beyond that at which the assembly effects maximum disc damping at normal or room temperature. Consequently, for the same air gap flux density and effective area, the shifting of the flux toward the axis of the disc along its radius would result first in an increase in damping force, and the disc would rotate more slowly, and vice versa. For a particular magnetic damping assembly 24L, for example, maximum damping of the disc 14 at a given ambient temperature might occur when the centers of the north pole face of the magnet 26L and the combined surfaces 36L and 42L are spaced from the disc axis by a distance which is approximately 80% of the radius of the disc. In such instance, the assembly may be positioned so that the aforesaid centers are spaced from the axis of the disc by a distance which is of the order of 90% of the radius thereof. As a result, the compensation achieved by the shifting flux distribution pattern alone, as set forth in the preceding paragraph, is aided by locating the damping assembly in the last-named position, to the end that the rotational speed of the disc is substantially unaffected by change in flux of the magnet 26L with variation in ambient temperature.

Figure 3:
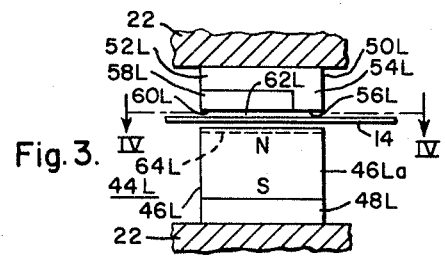
FIG. 3 is a view in front elevation with parts broken away and parts not shown of an alternate form of the invention.
Figure 4:
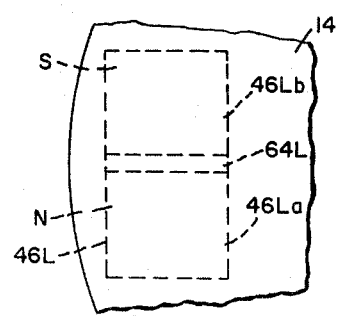
FIG. 4 is a view taken along the line IV—IV of FIG. 3.

Turning now to FIGS. 3 and 4, illustrated therein is a magnetic damping assembly 44L for the disc 14 which is an alternate form of the damping assembly 24L of FIGS. 1 and 2. The assembly 44L includes a double permanent magnet 46L formed of ceramic or ferrite permanent magnet material whose magnetic domains preferably are aligned or oriented. This material once again may be barium ferrite having the chemical formula set forth heretofore.

The magnet 46L is magnetized so that it has four poles, while are reversely arranged in a manner that will be clear by inspection of FIGS. 3 and 4. Thus, the magnet 46L has upper adjacent north and south poles respectively associated with lower adjacent south and north poles, such that it effectively comprises two similar adjacent permanent magnet sections 46L$a$ and 46L$b$. Although the sections 46L$a$ and 46L$b$ first may be formed as separate magnets and then mounted as shown to constitute the double magnet 46L, conveniently a unitary block of barium ferrite material may be magnetized by a process well known in the art to produce the adjacent sections 46L$a$ and 46L$b$.

The magnet 46L may be secured by any suitable means, such as cementing, to a soft magnetic base member 48L, which preferably is formed of cold rolled steel having a relatively low temperature coefficient of permeability. The member 48L, in turn, is secured to the frame 22.

On the opposite side of the disc 14 is a soft magnetic L-shaped member 50L formed of a leg 52L and an extension 54L. The member 50L preferably is fabricated of cold rolled steel having a relatively low temperature coefficient of magnetic permeability and also is secured to the frame 22. The extension 54L has a lower surface 56L spaced from the magnet 46L.

The member 50L partially surrounds a soft magnetic member 58L, which preferably is formed of nickel steel having a relatively high negative temperature coefficient of magnetic permeability. The member 58L is secured to the member 50L by any suitable means, such as cementing, and has a lower surface 60L adjacent the surface 56L of the extension 54L. The surfaces 56L and 60L thus define with the upper north and south pole faces of the magnet 46L an air gap 62L for receiving a radially extending portion of the disc 14. A central groove 64L may be formed in the upper surface of the permanent magnet 46L to separate the upper pole faces thereof in order to minimize leakage flux between the magnet sections 46La and 46Lb.

The path for flux produced by the magnet 46L may be traced as follows:

46La, 62L, 50L and 58L, 62L, 46Lb, 48L

Thus, the flux passes through the air gap 62L (and the disc 14) twice in opposite directions. Consequently, the damping assembly of FIGS. 3 and 4 does not require a yoke portion similar to the yoke portion 34L of FIGS. 1 and 2. It will be observed, however, that the components of the assembly of FIGS. 3 and 4 respectively perform substantially the same functions as the remaining components of the damping assembly of FIGS. 1 and 2. It will be apparent, therefore, that by suitably proportioning the extension 54L and the member 58L and spacing the damping assembly 44L from the vertical axis of the disc 14, the change in flux of the permanent magnet 46L with variation in ambient temperature may be compensated for in a manner which will be clear from the preceding discussion.

Although the invention has been described with reference to certain specific embodiments thereof, numerous modifications falling within the spirit and scope of the invention are possible.

I claim as my invention:

1. In an electrical device, an induction disc, means mounting said disc for rotation in the plane of the disc about a first axis, and a magnetic assembly for damping rotation of said disc, said assembly having a pair of first surfaces spaced from each other in the direction of said axis to define an air gap therebetween proportioned to receive a radially extending portion of said disc, said assembly including a first portion formed of cold rolled steel, and a ferrite permanent magnet carried by said first portion for directing magnetic flux through said air gap and said disc from one to the other of said first surfaces, said magnet having a negative temperature coefficient of flux and having a surface which constitutes one of said first surfaces, the other of said first surfaces being substantially planar and being formed by adjacent respective surfaces of second and third portions of said assembly both spaced in the direction of said axis from portions of the surface on the opposite side of the air gaps, said second portion being formed of cold rolled steel, said third portion being formed of nickel steel, said third portion having a temperature coefficient of magnetic permeability which is substantially more negative than that of each of said first and second portions, said third portion being disposed between said disc first axis and said second portion, said second and third portions being proportioned for varying the distribution pattern of magnetic flux in said air gap supplied by the permanent magnet with change in ambient temperature to compensate for variation in flux of said magnet with such temperature change.

2. In an electrical device, an induction disc, means mounting said disc for rotation in the plane of the disc about a first axis, and a magnetic assembly for damping rotation of said disc, said assembly having a pair of first surfaces spaced to define an air gap therebetween proportioned to receive a radially extending portion of said disc, said assembly including a first portion formed of cold rolled steel, and a ferrite permanent magnet carried by said first portion for directing magnetic flux through said air gap and said disc from one to the other of said first surfaces, said magnet having a negative temperature coefficient of flux and having a surface which constitutes one of said first surfaces, the other of said first surfaces being substantially planar and being formed by adjacent respective surfaces of second and third portions of said assembly, said second portion being formed of cold rolled steel, said third portion being formed of nickel steel, said third portion having a temperature coefficient of magnetic permeability which is substantially more negative than that of each of said first and second portions, said third portion being disposed between said disc first axis and said second portion, said second and third portions being proportioned for varying the distribution pattern of magnetic flux in said air gap supplied by the permanent magnet with change in ambient temperature to compensate for variation in flux of said magnet with such temperature change, and means mounting said assembly to space said second and third portions and said magnet from said first axis by a distance which is greater than the distance wherein said assembly effects maximum damping of rotation of said disc at a given ambient temperature.

3. A magnetic assembly having first and second surfaces spaced to define an air gap therebetween, said magnetic assembly comprising a permanent magnet magnetically oriented to establish a north pole and a south pole and means establishing first and second paths for directing magnetic fluxes in parallel from said permanent magnet through first and second parallel portions of said air gap between the surfaces, said paths being configured to receive from and return to surfaces of said permanent magnet in the direction of said orientation magnetic flux supplied to said air gap, said first path including a first soft magnetic part substantially external to the second path and providing the portion of said first surface bordering the first portion of said air gap, said second path including a second soft magnetic part substantially external to the first path and providing the portion of said first surface bordering the second portion of said air gap, said soft magnetic parts having different temperature coefficients of magnetic permeability, whereby a change in temperature of the magnetic assembly produces a change in the ratio of the magnetic fluxes in said portions of the air gap.

4. A magnetic assembly as defined in claim 3 wherein said permanent magnet is constructed of ferrite material, said first soft magnetic part is constructed of cold rolled steel and said second soft magnetic part is constructed of a material having a temperature coefficient of magnetic permeability which is substantially more negative than that of said cold rolled steel, the portions of the first surface formed by the first and second soft magnetic parts being substantially in the same plane.

5. In an electroresponsive device, a stator assembly, a rotor assembly including an electroconductive disc, means mounting the rotor assembly for rotation relative to the stator assembly about the axis of said disc, and a magnetic assembly for damping rotations of said disc, said assembly having first and second surfaces spaced to define an air gap therebetween for reception of a portion of the disc radially displaced from said axis, said magnetic assembly comprising a permanent magnet magnetically oriented to establish a north pole and a south pole and having a flux output which varies in response to a variation in temperature, and means establishing first and second paths for directing magnetic fluxes in parallel from said permanent magnet through first and second parallel portions of said air gap between the surfaces, said paths being configured to receive from and return to surfaces of said permanent magnet in the direction of said orientation magnetic flux supplied to said air gap, said first path including a first soft magnetic part substantially external to said second path and providing the portion of said first surface bordering the first portion of said air gap, said second path including a second soft magnetic part substantially external to said first path and providing the portion of said first surface bordering the second portion of said air gap, said soft magnetic parts having different temperature coefficients of magnetic permeability, whereby a change in temperature of the magnetic assembly produces a change in the ratio of the magnetic fluxes in said portions of the air gap proportioned to make the damping of rotation of said disc substantially independent of temperature.

6. A device as claimed in claim 5 wherein said soft magnetic parts are positioned and proportioned to move the effective center of the magnetic flux supplied therethrough to the air gap in a radial direction relative to said axis upon a change in temperature for maintaining the damping torque exerted between the stator and rotor assemblies substantially independent of temperature, the portions of the first surface formed by the first and second soft magnetic parts being substantially in the same plane.

7. A device as claimed in claim 6 wherein the permanent magnet is constructed of a ferrite material, said first magnetic part is constructed of cold rolled steel and the second magnetic part is constructed of a material having a temperature coefficient of magnetic permeability which is substantially more negative than that of said cold rolled steel, said magnetic parts being at different radial distances from said axis.

References Cited in the file of this patent

UNITED STATES PATENTS

| | | |
|---|---|---|
| 1,722,758 | Martin | July 30, 1929 |
| 2,144,546 | Reese et al. | Jan. 17, 1939 |
| 2,196,898 | Faus | Apr. 9, 1940 |
| 2,309,414 | Nobbs | Jan. 26, 1943 |
| 2,698,917 | Van Urk et al. | Jan. 4, 1955 |
| 2,794,090 | Ertl et al. | May 28, 1957 |
| 2,832,932 | Baermann | Apr. 29, 1958 |

FOREIGN PATENTS

| | | |
|---|---|---|
| 277,015 | Great Britain | May 24, 1928 |
| 390,885 | Great Britain | Apr. 20, 1933 |
| 391,475 | Great Britain | Apr. 18, 1933 |
| 546,606 | Great Britain | July 21, 1942 |